Sept. 13, 1966   F. S. FLICK ETAL   3,272,221
CONVERTIBLE VALVE DEVICE
Filed Nov. 8, 1963   3 Sheets-Sheet 1
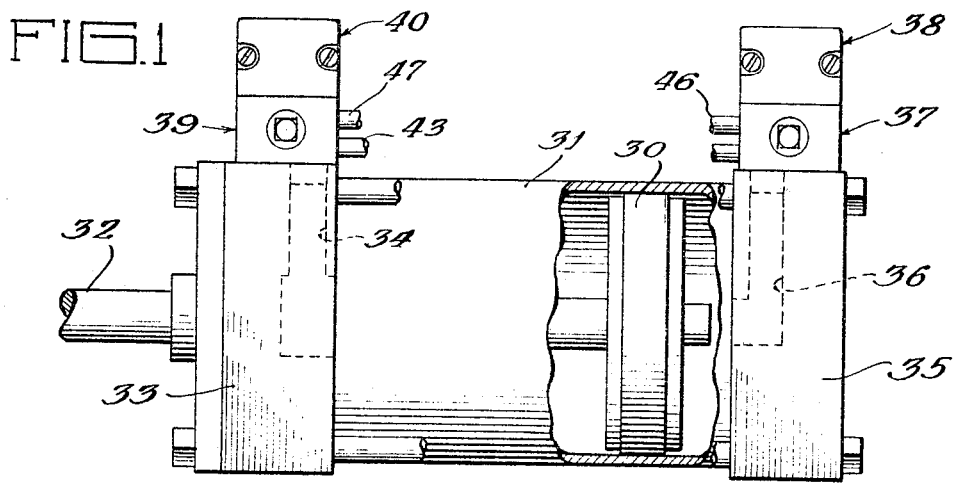
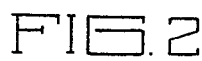
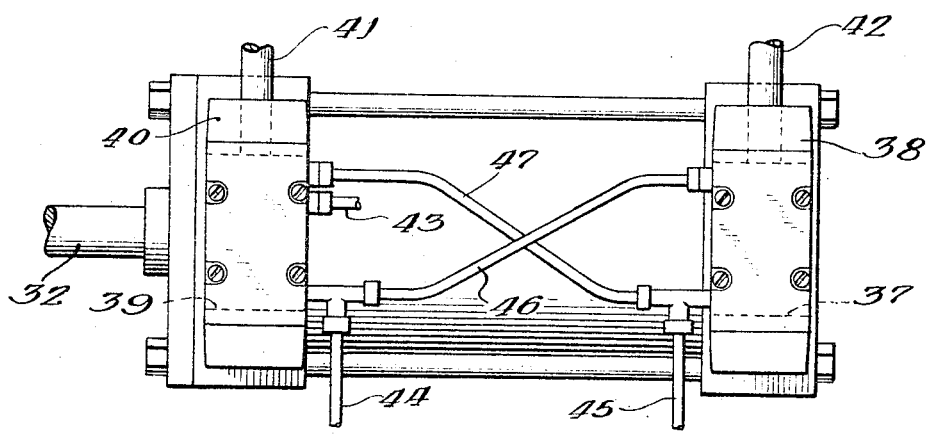
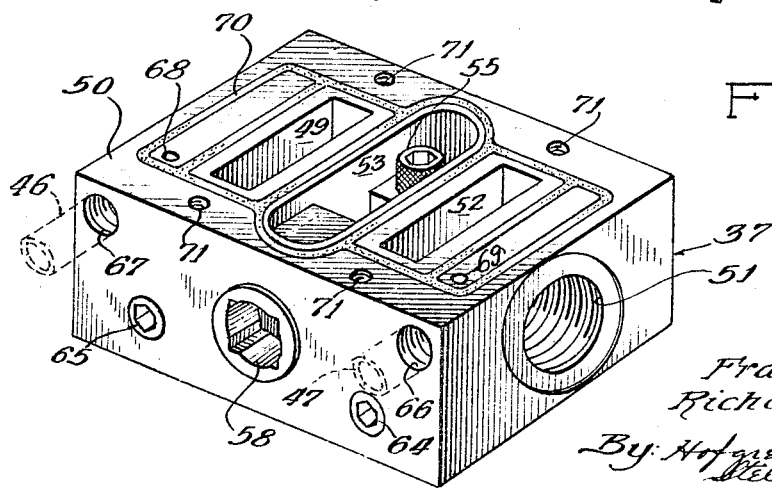
Inventors:
Francis S. Flick
Richard M. Morgan
By: Hofgren, Wegner, Allen,
Stellman & McCord
Attorneys

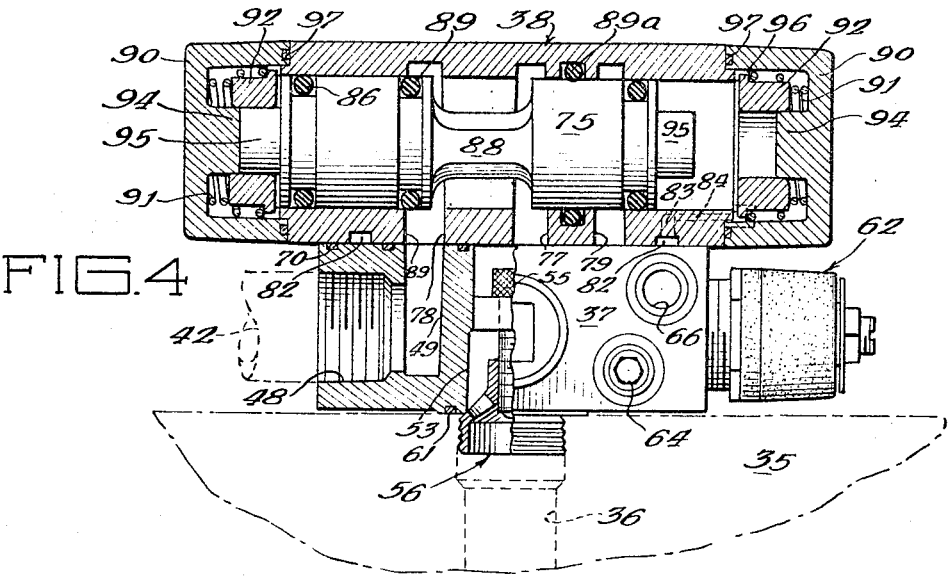
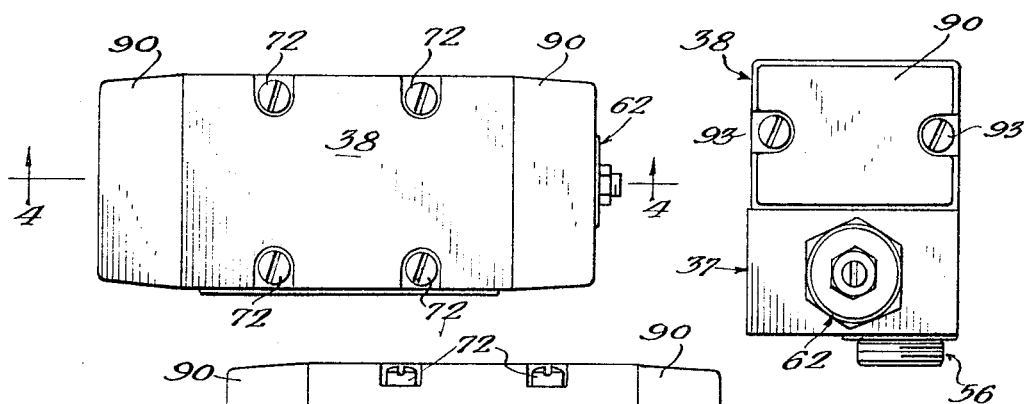
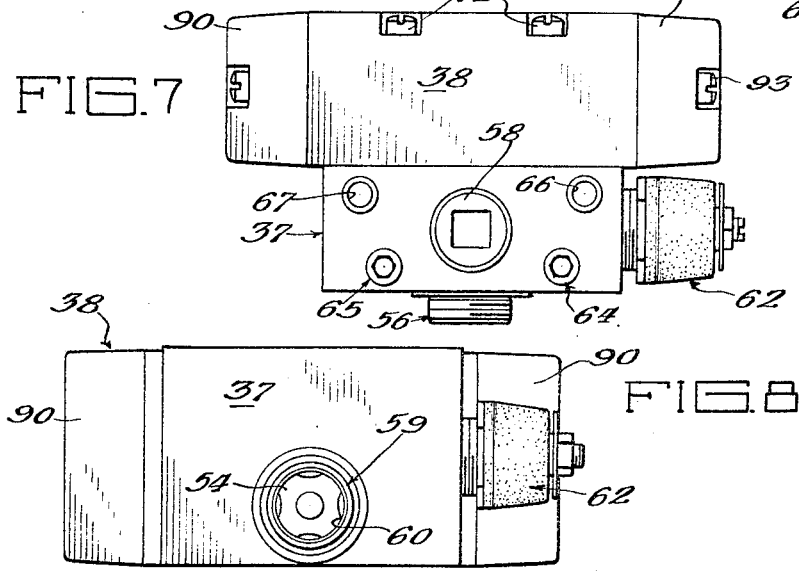

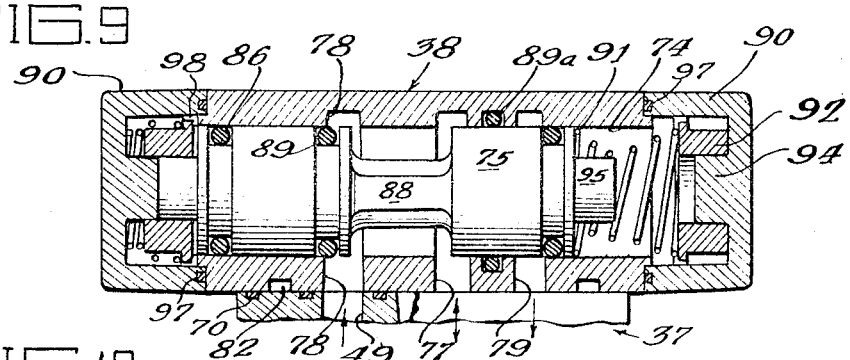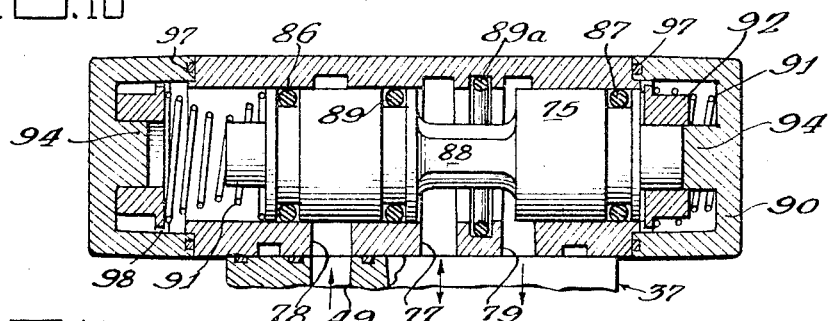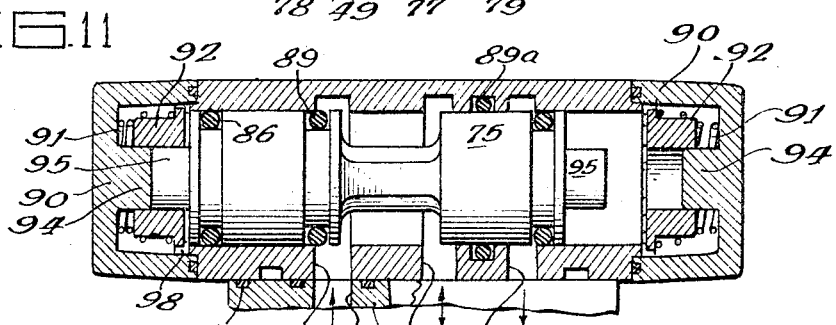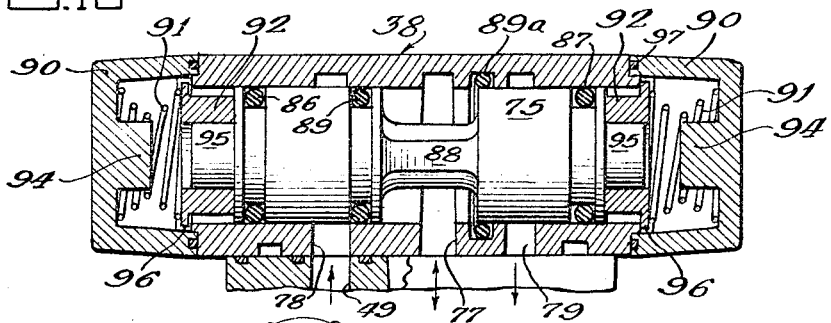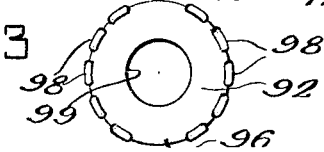

United States Patent Office 3,272,221
Patented Sept. 13, 1966

3,272,221
CONVERTIBLE VALVE DEVICE
Francis S. Flick, Oak Park, and Richard M. Morgan, River Forest, Ill., assignors to Flick-Reedy Corporation, a corporation of Illinois
Filed Nov. 8, 1963, Ser. No. 322,355
6 Claims. (Cl. 137—270)

This invention relates to a valving structure and more particularly to an air valve unit including a subplate and a spool-type valve mountable directly upon the port of a motor for controlling the flow of the motive fluid to and from such a motor.

In the pneumatic and hydraulic piston and cylinder control art, a large variety of different valves has been used to control the flow of fluid used to move the piston within the cylinder. These valves have had various definitions, including two-way, three-way, four-way, etc., these terms being definitive of the number of ports that the spool of the valve may serve to effect various connection between fluid passages or lines.

The present valve structure is particularly concerned with air valves but also operates with liquid fluids. The valve can perform all the operations of two-position valves, including a normally open, a normally closed, and a position determined by the position in which the valve was last set, more briefly referred to as a momentary impulse, and in addition thereto, the operation of a three-position valve in which a connection may be made between the air supply and the cylinder, the cylinder and the exhaust, or returned to a spring-centered position in which all ports of the valve are blocked.

It is therefore one of the objects of this invention to provide a valve with components arrangeable to provide for all of the two-position and three-position functions mentioned above.

It is another object of this invention to provide the valve with all of the components necessary to obtain the mentioned two-position and three-position operations, stored within the valve itself.

The primary object of this invention is to provide a new modular concept of valve construction and assembly for the control of air flow to an air motor.

The present air control valve may be actuated by air pressure taken from the supply, this operation sometimes being called a pilot-actuated valve. The fluid causing the actuation may be either air or a liquid. It is also a feature of the present new valve structure that a simple substitution of mechanism for a bonnet on the valve will permit operation of the valve by hand, foot, or other mechanical means, all of which may be termed non-air actuated valves.

It is a further feature of the new structure that a simple substitution of an adjustable spring member on one end of the valve will provide a unit holding the valve in a position until the pressure of an opposing force is built up to a predetermined value, whereby the valve may operate as a sequence controlling valve. It is therefore an object of this invention to provide simple means for converting the valve from pilot pressure to hand or mechanical operation by substitution of a bonnet on the valve body.

Other features, objects and advantages of the present invention will be apparent from the following desscription of a preferred embodiment thereof illustrated in the accompanying drawings, in which:

FIGURE 1 is a broken side elevational view partially in section of a piston and cylinder device with a pair of valve units of this invention mounted thereon;

FIGURE 2 is a top plan view of the structure shown in FIGURE 1;

FIGURE 3 is a perspective view of the subplate unit of the valving structure of this invention showing the top surface upon which the valve member is to be mounted;

FIGURE 4 is a central cross sectional view through the valve unit including the valve and the subplate showing in phantom the air connection piping and cylinder head upon which the unit is mounted, the subplate being in half section;

FIGURE 5 is a top plan view of the valving unit;

FIGURE 6 is an end elevational view of the valving unit;

FIGURE 7 is a side elevational view of the valving unit;

FIGURE 8 is a bottom plan view of the valving unit with the pipe port connecting device removed;

FIGURE 9 is a broken cross sectional view through the valve member showing the arrangement of parts arranged for a normally open valve operation;

FIGURE 10 is similar to FIGURE 9 showing the arrangement of parts for a normally closed valve operation;

FIGURE 11 is similar to FIGURE 9 showing the arrangement of parts for a momentary impulse valve operation;

FIGURE 12 is similar to FIGURE 9 showing the arrangement of parts for a three-position spring-centered valve operation;

FIGURE 13 is an end elevational view of a valve spring cage utilized in the valve structure shown in FIGURES 4 to 12.

Referring particularly to FIGURES 1 and 2 of the drawings, there is shown a piston and cylinder device having a piston 30 reciprocable within a cylinder barrel 31 in order to move a piston rod 32 in and out through a head 33. Piston and cylinder devices operated by air or hydraulic pressures are widely used for many operations, the present device being illustrated in a machine tool grade air cylinder. The head 33 has a port 34 through which air is conducted to the left-hand side of the piston 30. The cap 35 on the opposite end of the cylinder has a similar port 36 for conducting air to and from the cylinder on the right-hand side of the piston. The head and cap are of square design having flat surfaces with ports containing a threaded outer portion where the passages intersect the outer surface of the head or cap.

In the present invention the cylinder movement is controlled by a valve mounted as close as can be to the port in the head of the cylinder. In FIGURES 1 and 2 the valving unit so mounted comprises a subplate 37 and a valve 38 mounted directly thereon, the entire assembly being on the cap 35 of the cylinder. On the head of the cylinder at the left-hand end there is an identical subplate 39 and an identical valve 40. As best illustrated in FIGURE 2, air is conducted to the left-hand valve unit through a pipe 41 and to the right-hand unit through a pipe 42. These supply pipes may be conveniently provided with pipe threads and directly threaded into the respective subplates 37 and 39.

In FIGURE 2 certain air control tubing for the valves is illustrated. A control tubing 43 supplies air to a remote valve which controls the conduct of air to pilot air passages within the valves 38 and 40 for air actuation of the valve spools in valves 38 and 40. The line 44 is connected to the valves in such a fashion as to cause the valves 38 and 40 to be set to cause the piston rod 32 to retract into the cylinder and the line 45 produces the opposite effect. In this instance, the valves 38 and 40 would each be a two-position momentary impulse valve, that is, the spool in the valve would remain in the position to which it was forced by the pilot air pressure until such time as pilot pressure was introduced into the opposite end of the spool to move it to its other position. Since one set of pilots is cross connected by a control line tubing 46, a single control line 44 may conduct the control air to the opposite ends of the valves 38 and 40, effecting movement of the spools therein simultaneously and similarly the cross connected tubing 47 between the opposite ends of the valves moves the spools of the valves in the opposite direction.

Ordinarily, valves used to control the air motive fluid are termed power valves when used in a power line, and the valves which control the power valves are generally termed control valves when used in control lines. Valves 38 and 40 are power valves as used and as illustrated, since they control the air used as motive fluid for the piston and cylinder device when mounted as shown in FIGURES 1 and 2.

The valving structure is an assembly of two primary parts as illustrated in FIGURES 4 to 8. The subplate 37 is a rectangular box-like aluminum die-casting with certain machined surfaces and passages. As illustrated in FIGURE 4, the air inlet pipe 42 may be directly threaded into a pipe threaded port 48 in one end of the subplate so as to connect with the subplate passage 49 exiting the plate on the top flat machined surface (FIGURE 3). The spool valve 38 fastens directly onto the flat surface 50 of the subplate, its ports and air passages mating with those in the subplate.

The subplate structure is best illustrated in FIGURE 3. A threaded opening 51 is on the end opposite the opening 48 so that an air supply pipe may be threaded into either end of the subplate. Tapped passage 51 communicates with the upright passage 52 equally distant from the center of the subplate as is the passage 49. In the central part of the subplate there is a passage vertically through the subplate designated 53. It may be noted that intermediate the passage, there is a partial wall 54 providing a support for a machine screw 55 to be connected to the port nut 56 by which the entire subplate 37 might be attached to the threaded port of a piston and cylinder device such as the port 36 in the cap 35 (FIGURES 1 and 4). Air may be conducted through the central passage 53 through the port nut 56 on into the cylinder.

The central passage in the subplate is also provided with a lateral threaded opening 57 shown in this instance as being blocked by a plug 58, its purpose being the connection of the cylinder port air passage of one subplate to another. This connection may be needed when it is desired to operate two piston and cylinder devices simultaneously, in which case one valve could control motive fluid flow to two devices. Such port may also be used in sequence operation where the passage 57 is connected to the pilot control of another cylinder. When air is flowing into the piston and cylinder device generally little pressure build-up occurs until near the end of the stroke, at which time the pressure build-up could actuate a second device providing operation of the devices in sequence.

The physical act of connecting the subplate to the piston and cylinder head or cap is also used to seal the subplate to the cylinder head by means of an O-ring held captive in a groove 59 around the circular cylindrical passage 60 out of the central passage 53 in the bottom surface of the subplate. When the plate is pulled down tight on the cylinder head, the O-ring 61 (FIGURE 4) effectively seals between the subplate and cap. The area about the passage 60 may be slightly raised from the bottom flat surface of the subplate to insure proper O-ring sealing function as illustrated.

The subplate has its end passages 49 and 52 symmetrical about the center line so that either one can be the supply port and the other can act as the exhaust. Referring to FIGURE 4, when the air line is threaded into one of the ports, an exhaust muffler 62, a porous bronze member capable of controlling the speed of the device by metering the exhaust air, is threaded into the other port.

Each of the end ports in the subplate is provided with a threaded port and air supply may be taken from the one at the supply end of the subplate for operating control valves or other devices. Also air may be taken from the threaded port of the exhaust end of the subplate for operating other devices. Referring to FIGURE 7, a threaded passage 63 is tapped from one side of the subplate 37 normal thereto in position to intersect the passage 52 in one corner of the passage. When not in use, a socketed threaded plug 64 may be inserted in the passage (FIGURE 3). At other times a tubing may be connected with the passage in order to obtain air from either the air or the exhaust ports in the subplate. Referring to FIGURE 3, the similar threaded passage in passage 49 is shown provided with a plug 65. Sequence operations may be controlled with air from the exhaust side as well as the supply side of the subplate 37.

The subplate is also provided with passages for conducting pilot air pressure to a valve such as 38 mounted on the subplate. The passages for conducting the pilot air are shown in FIGURES 3 and 7. At each end of the subplate there is a threaded passage 66 or 67 perpendicular to the side of the subplate and to which an upright drilled hole 68 or 69, respectively, is connected. Thus, tubing such as 46 connected to the pilot connection of the subplate may conduct air to the flat upper surface 50 for the purpose of providing pilot actuation of the valve 38 mounted on the subplate.

The physical act of mounting the valve 38 on the subplate 37 also seals the valve to the subplate. Extending around each of the passages in a continuous fashion and mounted in a groove in the flat upper surface of the subplate is a resilient gasket 70. When the valve is mounted on the subplate, the resilient gasket seals the valve and subplate together. Four tapped bores 71 extend into the subplate block at right angles to the flat upper surface 50 for the purpose of receiving screw fasteners 72 extending vertically through the valve housing to attach the valve to the subplate. The screws and their threaded bores are symmetrical about longitudinal and lateral center lines permitting the valve to be mounted end-for-end in either of two positions 180° apart permitting the inlet air line to be piped to either end of the subplate. The ports are arranged for mating in either position of the valve relative to the subplate.

The power valve of this invention comprises a minimum number of parts. The body 73 (FIGURE 9) is an aluminum die-casting having a longitudnal bore 74 for the reception of a valve spool 75. The valving body has a flat lower surface 76 intended to rest against the gasket 70 on the flat upper surface 50 of the subplate. The longitudinal bore of the valve body is intersected by three ports or air passages, each formed as illustrated in FIGURE 21. The central air passage 77 extends from the flate surface 76 upwardly substantially perpendicular to the longitudinal bore 74. It is larger than the bore 74 in order to provide a passage all around the bore. While the central passage 77 is slightly off-center, it may be noted that the central passage in the subplate 37 is wider than the passage in the valve body so that the two passages will mate when the valve is turned end-for-end on the subplate. The valve body is provided with an inlet air passage 78 and exhaust passage 79 equidistant from the center of the valve body.

The manner in which the pilot air pressure is conducted to the end of the valve body is best illustrated in FIGURES 3, 4 and 9. A groove 82 extends crosswise of the valve body and indented from the flat lower surface 76. At one end of the groove a bore 83 extends into the body toward the central bore 74. A small longitudinally extending passage 84 connects the bore 83 with the end of the valve body just outside of a projecting flange 85 integral with the end of the body. The provision of the groove 82 across the valve body permits the pilot air passages 68 or 69 in the subplate to always have communication with the end of the valve body. Nothing herein should be construed as limiting the actuation of the valve with air only as the pilot passages could be supplied with liquid under pressure from another source so that the valve would be hydraulically actuated.

Referring to FIGURE 4, the valve spool 75 carries an O-ring seal 86 at one end and a similar O-ring 87 at the opposite end for sealing the ends of the spool to the bore of the body. Pilot air pressure conducted to the end of the valve body can thus act on the end of the spool and be sealed from the balance of the valve by the O-rings 86 and 87.

As illustrated in FIGURE 4, the inlet air comes into the left-hand side of the valve and is prevented from going past the reduced section 88 on the spool by the O-ring 89 cooperating with the bore 74 acting as a land. As illustrated in FIGURE 4, the valve 38 is arranged as a momentary impulse valve. The spool will stay in either extreme to which it has been moved.

Each end of the valve has three parts, a bonnet 90, a valve spring 91 and a valve spring cage 92. The bonnet is rectangular as shown in FIGURE 6, held in place by a pair of screw fasteners 93 threaded through the valve bonnet and into the valve body. On the inside, the bonnet has a circular cylindrical recess and a central round post 94. The post cooperates with the round extension 95 on the end of the spool providing a stop, limiting movement of the spool in the body.

The valve spring cage and the spring may be mounted in different positions between the spool and the bonnet depending upon the desired operation of the valve. The cage has a cylindrical part which is of a size to extend into the bore 74 in the valve body quite easily and an outer flange 96 at one end of the cylindrical part too large to fit into the bore 74 but readily movable in the larger bore in the bonnet. As shown in FIGURE 4, the valve spring is held captive between the flange 96 on the cage and the end wall of the bonnet so that it is inoperative. The spring itself is a coiled compression spring with one end small enough to fit within the bore 74 of the valve body and the other end being larger to fit about the cylindrical part of the cage and against the enlarged flange 96. One of the features of the present invention is that the cage and spring are present in the valve package and thus available for making the valve into different operative arrangements. The bonnets may be easily removed and attached to the valve body being sealed thereto by a rectangular O-ring 97 operative upon the fact of attachment of the bonnet to the valve body. The bore in the bonnet is sufficiently large not to interfere with the passage of pilot air pressure through the pilot passages into the bonnet.

The different arrangements of the cage and spring to the ends of the valve spool to obtain different modes of operation of the valve are illustrated in FIGURES 9 to 12. In each of the figures, the air inlet is the left-hand port, the central port is connected to the piston and cylinder device and the right-hand port is the exhaust port, all as indicated by the arrows adjacent the passages.

FIGURE 9 shows a normally open valve. In this instance the cage 92 on the right-hand side is mounted with its cylindrical part against the bottom wall of the bonnet 90 so that the cage surrounds the upstanding post 94 in the bonnet. The small end of the spring 91 is caused to enter the bore of the valve body so as to bear against the valve spool 75. The larger end of the spring bears outwardly against the end of the cage. The spring thus actively urges the valve spool to the left and into the position illustrated wherein the air supply is connected to the cylinder.

The left-hand end of the normally open valve shown in FIGURE 9 has its cage holding the spring compressed between the flange on the cage and the end wall of the bonnet in an inoperative position. The cage flange engages the raised end 85 of the valve body limiting its travel toward the valve body. The valve will be closed by pilot air pressure conducted into the left-hand end of the valve of sufficient magnitude to overcome the compression in the spring 91 on the right-hand end, thus forcing the spool to the right. The spool travel is arrested by engagement of the projection 95 on the spool with the post 94 in the bonnet 90.

FIGURE 10 shows the position of the cages and springs to provide a normally closed valve. Thus, the right-hand cage 92 holds the spring 91 between its flange and the end wall of the bonnet 90. The left-hand cage is mounted about the central post 94 of the bonnet and holds the spring actively compressed between the cage and the end of the valve spool, thus urging the spool to its right-hand position with the right-hand projection against the post in the right-hand bonnet. Quite obviously, this position of the valve spool connects the exhaust passage with the central passage 77 in the center of the valve while the O-ring 89 cooperating with the bore 74 of the valve closes communication between the supply and cylinder.

FIGURE 11 shows the condition and arrangement of the spools and springs providing the valve with a momentary impulse operation. It is a two-position valve in which the valve spool 75 is moved to its extreme position to the left or to its extreme position to the right by the impulse of pilot air pressure acting on the end of the spool. Once the spool is moved, it will remain in its extreme position until acted upon by pilot air pressure, thus moving the spool in the opposite direction.

For momentary impulse operation each cage 92 holds the spring 91 between its flange and the end wall of the bonnet 90. Thus, each spring is in effect inactive so that the valve spool travels between extreme positions with its end projections 95 abutting one or the other of the posts 94 of the bonnets.

In FIGURE 12, a three-position spring-centered valve operation is accomplished by the arrangement of valve cages and spring. Each end of the valve is the same so that the springs with the cages abutting against stops and the spool abutting the cages centers the valve spool closing all ports. In this instance, the cage 92 is turned end-for-end from its position described above, so that its cylindrical part extends into the valve bore 74, the extent being limited by the flange 96 on the cage engaging the end 85 of the valve body. The spring 91 is compressed between the end wall of the bonnet 90 and the cage. As the valve spool 75 moves against the compression of the spring 91, the cage can move inside the bonnet to allow the movement of the spool 75. The cage may actually telescope to a slight extent over the post 94 during such operation. The valve spool is ordinarily moved by pilot air pressure conducted to one bonnet or the other, the air pressure being sufficient to overcome the spring compression. Once the air pressure is released, the described arrangement of springs and cages positively will return the valve spool to its center position blocking all ports.

The present valve structure 38 thus contains within its package all of the structure by which the valve can alternatively be made to function as a two-position normally open valve, a normally closed valve, a momentary impulse valve, or a three-position, spring-centered valve. The change from one mode of operation to another may be very simply accomplished since either bonnet 90 may be easily removed, the arrangement of the cage and spring selected and the bonnet reattached to the valve body.

The valve cage is also preferably an aluminum diecasting in which the flange 96 is provided with spaced enlarged nodules 98 which extend beyond the end of the flange longitudinally of the central bore 99 and also extend laterally outwardly so that while the cage is mounted within the valve, there is always space between the nodules through which air for pilot operation of the valve may be conducted (FIGURE 13).

The operation of the valve unit, while equipped with the components arrangeable for the various open, closed, momentary impulse and spring-centered operations specified, is also readily convertible to other operations. In a sequence operation where two piston and cylinder devices, for example, are to operate one after the other, the valve may be modified to provide such operation automatically. In this instance, the valve on the first cylinder might be a momentary impulse air-actuated valve and a connection into the central port of the subplate 37 through the removal of plug 58 would be made to the pilot connection of the subplate on an adjacent cylinder. Air pressure in the first cylinder subplate would build up in amount when the first cylinder reached the end of its stroke. This increase of pressure would also be conducted through the connected line to the pilot operator of the second cylinder's power valve.

In order to make the second valve described above work in the sequence operation, the valve spool of the valve would be kept in either a normally open or a normally closed position by an adjustable spring which is intended to be overcome by the air pressure from the central port of the first cylinder power valve subplate. Thus, the bonnet on the left-hand end of the valve such as illustrated in FIGURE 10 or the bonnet on the right-hand end of FIGURE 9 is replaced by a bonnet containing an adjustable spring against which the air pressure will operate through the intermediary of the valve spool. Referring to FIGURES 4 and 7, it may be noted the valve 38 is mounted on the same subplate 37 having the air supply pipe 42 threaded into the supply port 48 communicating with the air supply passage 78 in the valve body through the supply passage 49 in the subplate. The left-hand ordinary bonnet, cage and spring may be removed and replaced by a sequence bonnet. An adjustment of spring pressure in the sequence bonnet can vary the magnitude of air pressure which has to be exerted against the right-hand end of the valve 38 to overcome the spring pressure and thus open the valve for sequence operation of piston and cylinder devices. By maintaining the pilot pressure on the right-hand end of the valve 38, the valve may be held open as long as desired. The sequencing operation can cause the movement of the piston rods of the controlled cylinders in one direction in sequence and then in the opposite direction in sequence or together or in other sequences as desired.

Manual control of the valves is also desirable in certain circumstances. A foot treadle, palm buttons, or hand levers are various manual means for operating valves. The present valve structure is particularly adaptable to any of these operations. Ordinarily, the hand lever replaces the right-hand bonnet on the valve as illustrated in FIGURE 4.

A handle operator may move the valve spool in opposition to spring pressure exerted against the valve spool to provide a normally closed valve as shown in FIGURE 10. It may also be used so that air pressure in the pilot port causes the valve to be normally closed. Since the handle is connected to the valve spool, it can be used to close, open, or hold the valve spool in a centered position where all ports are closed.

The present valving unit is admirably suited for remote control or the mounting of controls directly to the subplate part of the unit.

It may be seen from the foregoing that the present valving unit provides a novel modular construction whereby the components may be secured together to get whatever valve operation is desired. By directly attaching a subplate to each port of a piston and cylinder device and piping the air supply to that subplate, many advantages accrue. Pressure regulators may be set independently of each other to provide whatever pressure is desired on each end of the cylinder. High pressure may be desired for the working stroke and relatively low pressure for the return stroke, thus saving considerable expense in compressing air.

The direct mounting of the valving unit on the ports of a piston and cylinder device provides the greatest speed of operation as well as providing the greatest flexibility in the type of operation desired. The valving unit has great flexibility in providing various operations and carrying the components therein for supplying these operations. However, it is contemplated that the greatest benefits can be achieved by using the valve as a momentary impulse air-actuated valve structure. The controls for air actuation can be all air and merely started and stopped electrically at a remote location or any hand, foot, treadle or other manually operated remotely placed control valve. This gives all the advantages of greater speed and air savings and piping savings by mounting the power valve close to the motor and making variations only in the manner of control. The necessity for various sizes of power valves and different modes of operation thereof may be eliminated.

The use of momentary impulse valves 38 and 40 also simplifies the problem of piping. After connections are made in a particular installation, the controls may be actuated and the cylinder operation observed. Should the piston rod move in the wrong direction in relation to the throw of the control valves, the control leads may be simply reversed either at the subplates 37 and 39 or at the control valves. Complicated piping diagrams may be largely eliminated by the use of the present valving structure.

The foregoing detailed description has been given for clearness of understanding only and no unnecessary limitations should be understood therefrom as some modifications will be obvious to those skilled in the art.

We claim:
1. A self-contained valve package for normally open, normally closed, spring-centered and momentary impulse operation in selective alternative, comprising:
    an elongate valve body having a longitudinal bore and longitudinally spaced ports and passages communicating the bore with the exterior of the valve body,
    a valve spool slidable in the bore for selective connection and closing of the passages,
    a removable closure for each end of the valve body,
    a valve spring and a valve spring cage means mounted in tandem between the valve spool and said closure, said spring having one end of a size to enter the valve body bore and an opposite end of a size to extend about the cage means, said cage means and spring being serially arrangeable for engagement with and between the valve spool and closure and for engagement with and between the valve body and closure alternatively to provide said valve operations selectively.

2. The valve package of claim 1 in which the valve spring cage has a cylindrical portion loosely slidable in the valve body bore and an outwardly extending flange slidable in the end closure but too large to enter the valve body bore, said flange being at one extremity of the cage so that the cage may be oriented in the valve with the cylindrical portion facing toward and away from the valve spool alternatively, said cylindrical portion engaging the valve spool when mounted to face the valve spool.

3. The valve package of claim 2 wherein the spring is a coiled compression spring with one end of a size to fit over said cage cylindrical part and into the closure and the other end is of smaller size to fit into said valve body bore.

4. A self-contained valve package for normally open, normally closed, spring-centered and momentary impulse operation in selective alternative, comprising:
    an elongate valve body having a longitudinal bore and longitudinally spaced passages and ports communicating the bore with the exterior of the valve body,
    a valve spool movable in the body bore for connecting and closing the passages selectively,
    a generally cup-shaped closure bonnet removably secured to each end of the valve body, a compression spring and a valve spring cage means mounted in tandem generally within each bonnet, said spring having one end sized to enter the valve body bore and an opposite end sized to extend about the cage means, said spring and cage means being selectively arrangeable serially in respective alternative engagement with and between the bonnet and valve spool and with and between the bonnet and valve body to provide alternatively said valve operations.

5. A self-contained valve package for normally open, normally closed, spring-centered and momentary impulse operation in selective alternative, comprising:

an elongate valve body having a longitudinal bore and longitudinally spaced ports and passages communicating the bore with the exterior of the valve body,
a valve spool slidable in the bore for selective connection and closing of the passages,
a generally cup-shaped closure bonnet removably secured on each end of the valve body,
a valve spring cage between the spool and bonnet, said cage having a cylindrical portion with an enlarged flange at one end, said cylindrical portion being slidable within the valve body bore with said flange abutting the end of the housing,
said cylindrical portion engaging said spool when mounted to face the spool,
a coiled compression valve spring having one end of a size to enter said valve body bore and the opposite end of a size to extend about said cylindrical portion of said cage,
said spring and cage being arrangeable seriatim in tandem between said valve spool and bonnet alternately to engage and urge said spool away from the bonnet and to store said spring away from said spool providing said valve operations selectively.

6. A spool-type valve, comprising:
an elongate valve body having a longitudinal bore extending through the body, a flat outer surface and three longitudinally spaced ports and passages communicating the bore with the exterior of the body within the confines of said outer surface,
a spool movable longitudinally in the bore, said body and spool having cooperating lands and grooves alternately capable of closing said ports and connecting preselected pairs of said ports,
a bonnet enclosing the end of the valve body,
a coiled compression valve spring and a spring cage within the bonnet,
the bonnet having a cylindrical recess in general longitudinal alignment with the bore in the body, the cage having one cylindrical portion slidable in the recess and another cylindrical portion slidable in the body bore,
said another cylindrical portion engaging said spool when mounted to face said spool,
the spring having a coil at one end of a size to fit over the cage portion slidable in the body bore and a coil at the other end slidably movable into the body bore whereby the cage and spring may be arranged in tandem between the bonnet and valve spool in both active and inactive relation to the valve spool.

References Cited by the Examiner

UNITED STATES PATENTS

| | | | |
|---|---|---|---|
| 2,911,994 | 11/1959 | Branson | 137—270 |
| 2,920,650 | 1/1960 | Moog | 137—625.69 |
| 2,927,602 | 3/1960 | Eklund | 137—343 |
| 2,958,339 | 11/1960 | Meddock | 137—625.63 X |
| 2,994,339 | 8/1961 | Massey | 137—343 |
| 3,009,480 | 11/1961 | Miller | 137—625.69 |
| 3,060,970 | 10/1962 | Aslan | 251—367 X |
| 3,063,465 | 11/1962 | Oros | 137—270 |

M. CARY NELSON, *Primary Examiner.*

MARTIN SCHWADRON, *Examiner.*